Feb. 28, 1939.    R. H. BERGSTRÖM    2,148,852
HOLDER BLOCK FOR TOOL HOLDERS
Filed Dec. 18, 1937    3 Sheets-Sheet 1
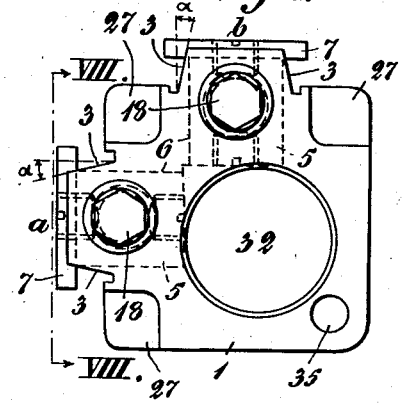
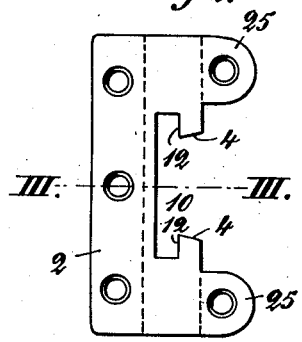
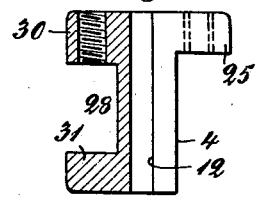
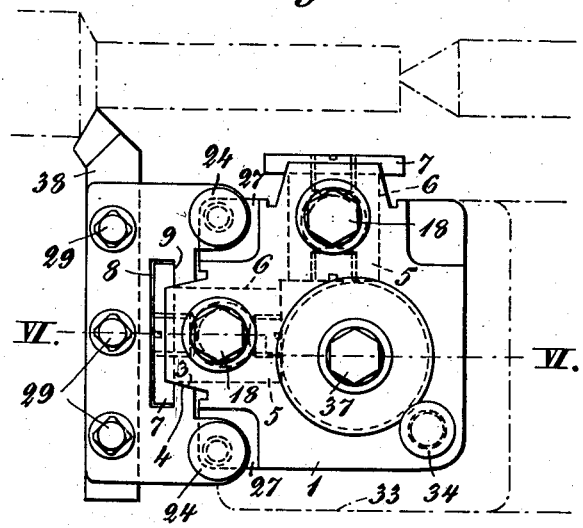
INVENTOR
ROAR HENRY BERGSTRÖM
By: Haseltine Lake & Co.
ATTORNEYS Feb. 28, 1939.    R. H. BERGSTRÖM    2,148,852
HOLDER BLOCK FOR TOOL HOLDERS
Filed Dec. 18, 1937    3 Sheets-Sheet 2
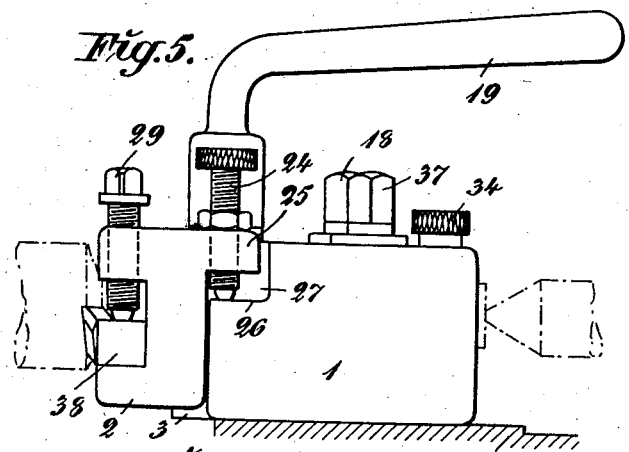
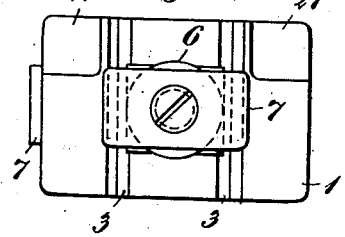
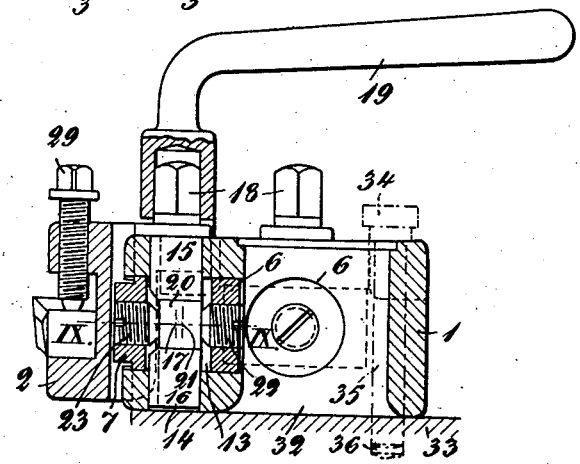
INVENTOR
ROAR HENRY BERGSTRÖM
ATTORNEYS Feb. 28, 1939.                R. H. BERGSTRÖM                2,148,852
                        HOLDER BLOCK FOR TOOL HOLDERS
                        Filed Dec. 18, 1937        3 Sheets—Sheet 3
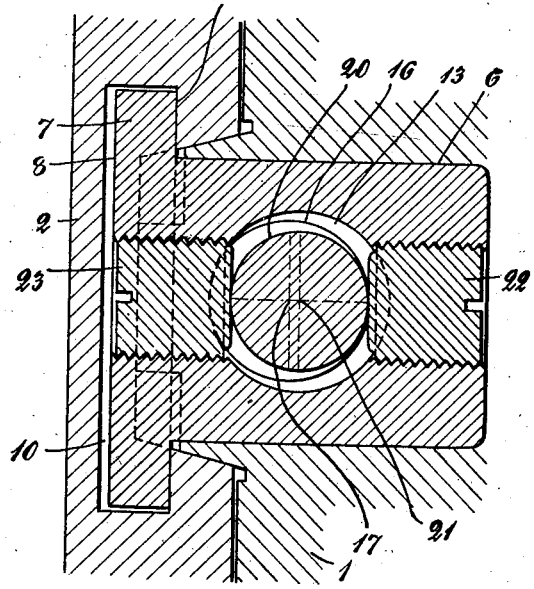
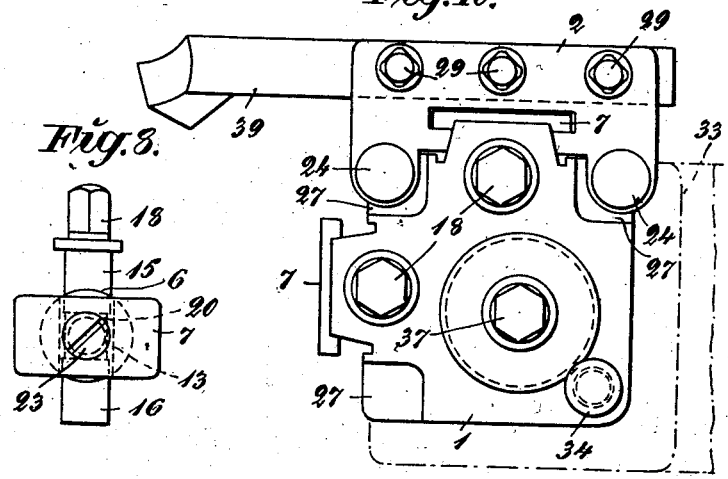
INVENTOR
ROAR HENRY BERGSTRÖM
By: Haseltine, Lake & Co.
ATTORNEYS Patented Feb. 28, 1939

2,148,852

UNITED STATES PATENT OFFICE 2,148,852

HOLDER BLOCK FOR TOOL HOLDERS

Roar Henry Bergström, Halmstad, Sweden

Application December 18, 1937, Serial No. 180,619
In Sweden December 22, 1936

6 Claims. (Cl. 29—99)

The present invention refers to an arrangement in holder blocks for tool holders adapted, for instance, to be secured to the support of a lathe and provided with a clamping means adapted for the clamping of tool holders and consisting of a clamping member displaceably mounted in the holder block and adapted to engage a recess provided in the tool holder and by its displacement to clamp the tool holder to the holder block and to release the same therefrom respectively.

The distinguishing feature of the invention primarily consists in that a locking bolt rotatably mounted in the holder block extends through a recess in the clamping member and is provided with an eccentric portion arranged at the turning of the locking bolt to exert a direct pressure on the clamping member both at the movement of the latter to effect clamping of the tool holder and at the movement thereof to loosen the same.

According to one embodiment, two adjustable parts—such as set screws screwed into the clamping member—arranged in the clamping member on opposite sides of the locking bolt and adjustable in the directions of displacement of the clamping member are so arranged that at the turning of the locking bolt one or the other of the adjustable parts is subjected to a direct pressure from the eccentric portion of the locking bolt.

This arrangement brings about the advantage that any wear of cooperating clamping surfaces of the holder block and the tool holder or any wear of the eccentric portion of the locking bolt may be compensated for by a corresponding adjustment of the said adjustable parts (set screws), so that in spite of the wear an effective clamping of the tool holder will always be ensured.

Such clamping means may be provided on two adjacent sides of the holder block with directions of displacement at right angles to each other, so that an alternative clamping of a tool holder on these different sides on the holder block is rendered possible.

The clamping member may be provided in known manner with a projecting flange or head entering a prismatic vertical recess provided in the tool holder, so that the latter may be displaced in a vertical direction along the holder block with the guidance of the said flange. In connection with this arrangement it is previously known to provide a set screw threaded into the tool holder, said set screw being adapted by abutting against a member connected with the holder block to adjust the tool holder in the desired vertical position prior to the clamping thereof, which set screw is arranged centrally on the tool holder.

On the other hand, the present invention provides for two vertical set screws threaded into the end portions of the tool holder, by which arrangement a more accurate vertical positioning of the tool holder is obviously rendered possible. For this purpose, and to facilitate a lower arrangement of the tool holder relatively to the holder block, a recess is provided in the upper corners of the holder block on both sides of each clamping member, said recesses being adapted to receive lugs or projections provided on the end portions of the tool holder and projecting into the said recesses when the tool holder is secured to the holder block. Threaded into the said lugs are vertical set screws. By setting the lower ends of these screws against the bottom of the recesses, the tool holder may be adjusted into the correct vertical position prior to being clamped. With the arrangement of two clamping members on adjacent sides of the holder block in the manner above described, a recess of the kind in question may be provided at three corners of the holder block, so that one of them will be commonly serviceable when tool holders are to be secured on said both sides.

In holder blocks as hitherto known, obliquely directed vertical clamping surfaces would be provided at the corners of the holder block to cooperate with oblique clamping surfaces provided on the end portions of the tool holders. In this arrangement, a considerable bending moment would be exerted on the tool holder which would be subjected to deformation thereby. According to the present invention, such oblique clamping surfaces are provided between the corners of the holder block and the clamping member, preferably in the proximity of the latter, which in known manner is arranged centrally on the side of the holder block. By this arrangement the clamping surfaces will be considerably approached to one another, so that the bending moment exerted on the tool holder in the clamping operation cannot have any detrimental effect on the tool holder.

In order that the invention may be more clearly understood reference will now be made to the accompanying drawings which show by way of example preferred embodiments thereof.

In the drawings:—

Fig. 1 is a plan view of the holder block proper.

Fig. 2 is a plan view of a tool holder, and Fig. 3 shows a section on line III—III in Fig. 2.

Fig. 4 is a plan view of a holder block placed upon the support of a lathe and having a tool holder with a lathe tool clamped onto the one clamping side of the block.

Fig. 5 shows an elevation of the arrangement according to Fig. 4.

Fig. 6 shows a vertical section on line VI—VI in Fig. 4.

Fig. 7 shows the holder block proper in elevation.

Fig. 8 is a detail view of the clamping device for the tool holder viewed along the line VIII—VIII in Fig. 1.

Fig. 9 is a horizontal section on line IX—IX in Fig. 6 to a larger scale.

Fig. 10 is a plan view of the holder block with a tool holder with a lathe tool clamped onto the other clamping side of the block.

In the drawings like references designate the same or similar parts.

1 designates the holder block proper, to the two adjacent clamping sides $a$ and $b$ of which a tool holder 2 may be alternatively clamped. To this end, the holder block is provided on the two sides $a$ and $b$ with two vertical clamping surfaces 3 directed obliquely outwardly, the angle of inclination $\alpha$ of which clamping surfaces may preferably be about 15°. Provided on the tool holder 2 are two corresponding obliquely directed vertical clamping surfaces 4, which may be pressed against the clamping surfaces 3 of the holder block by means of special clamping devices provided in the holder block and described more fully hereinbelow, so that a clamping effect will be obtained and the tool holder is securely locked to the holder block. A clamping device of this kind, and denoted in its entirety by 5, is arranged about centrally on each clamping side $a$ and $b$ respectively, and is shown in detail in Figs. 6, 8 and 9.

Each clamping device comprises a clamping member consisting of a cylindrical member 6 fitted from the outside into a horizontal bore in the holder block, said member 6 being provided on the outside thereof with a flange or head 7 of rectangular shape, for example. The flange 7 is provided with plane vertical outer and inner sides 8 and 9 respectively. Provided in the tool holder 2 is a prismatic vertical recess 10 (Figs. 2 and 3), which is so adapted that the flange 7 may be introduced into the bore 10 with a certain play, when the tool holder 2 is displaced vertically downwards (see Figs. 4 and 9) to be secured on the holder block 1. The clamping of the tool holder is effected so that the member 6 with the flange 7 is pressed in a direction against the holder block 1 by means of a device to be described hereinafter. The inside 9 of the flange 7 is then pressed against the plane surfaces 12 (Figs. 2 and 3) of the recess 10, so that the oblique surfaces 4 of the tool holder 2 are pressed against and clamped to the corresponding oblique surfaces 3 of the holder block.

Provided in the cylindrical member 6 is a vertical bore 13 having a locking bolt 14 extending therethrough. The locking bolt is provided with two cylindrical end portions 15 and 16, by means of which it is rotatably mounted in corresponding bores provided in the holder block 1, the axis of which bores is designated by 17 (Fig. 1). At the top, the locking bolt terminates in a square-head or a hexagonal head 18, so that the locking bolt may be turned by means of a key 19 thrust upon the head 18. Between the cylindrical end portions 15 and 16, the locking bolt is provided with a turned-down, cylindrical portion 20, which is eccentrical relatively to the portions 15, 16, however, the axis of the eccentric portion 20 is denoted by 21. Furthermore, two axial threaded bores are provided in the cylinder 6 on both sides of the bore 13, the axes of said threaded bores intersecting the axis 17. Screwed into the said bores are two set screws 22 and 23 respectively, so that their inner end surfaces are caused to bear on the eccentric portion 20 of the locking bolt (see Figs. 6 and 8). Therefore, when the locking bolt is turned, the eccentric portion 20 will displace the cylindrical member 6 with the flange 7 inwardly and outwardly respectively in the holder block by a pressure exerted on the one or the other of the set screws 22 and 23 respectively. In the position according to Fig. 9, the cylindrical member 6 has been displaced inwardly as far as possible by the pressure of the locking bolt on the set screw 22, and will in this position have clamped the surfaces 3 and 4 tightly against each other by the pressure of the flange 7 against the tool holder 2. If the locking bolt is turned further, the axis 21 turns along a circular path about the axis 17, so that the eccentric portion 20 commences instead to press against the set screw 23 so as to displace the cylindrical member 6 outwardly, so that the flange 7 is caused to release the clamping of the tool holder on the holder block. If the distance between the axes 17 and 21 be $c$, the whole deflection of the clamping device 6, 7 between the two limit positions will thus always be equal to $2c$. Any wear of the clamping surfaces 3, 4 is compensated for by a corresponding outward screwing of the set screw 23 and an inward screwing of the set screw 22, so that the cylindrical member 6 is displaced through a corresponding distance further inwardly in the holder block. Any wear of the eccentric portions 20 is compensated by a corresponding inward screwing of the two set screws 22, 23, until the play disappears, after which the deflection will still be $2c$.

Before the tool holder 2 is clamped to the holder block, the tool holder is to be adjusted into the desired vertical position. This is effected by means of two set screws 24 extending through lugs or projections 25 of the tool holder. Provided in three of the upper corners of the holder block are recesses 27, the lower ends of the set screws 24 being intended to be set against the lower horizontal bottom 26 of said recesses 27 to adjust the tool holder into the desired vertical position (Fig. 5). As will appear from Fig. 1, two such recesses 27 are arranged on each clamping side $a$ and $b$ respectively, the two sides thus having one of said recesses in common.

Provided in the side of the tool holder remote from the holder block is a recess 28 which is limited at the top and bottom by flanges 30 and 31 respectively. The tool is clamped in the recess by means of a number of set screws 29 threaded into the upper flange 30, so that the tool is clamped tightly against the lower flange 31.

Provided in the holder block is a vertical bore 32. When the holder block is placed on the support 33, a pin arranged on the support is caused to enter the bore 32. To bring the holder block into proper position relatively to the working machine, a guide pin 34 (indicated by chain-dotted lines in Fig. 6) is then introduced through a bore 35 provided in the holder block, and is fitted into a corresponding bore 36 in the support. The holder block is then secured to the pin of the support by means of a suitable screw connection 37.

Figs. 4 and 5 illustrate a tool holder clamped onto the clamping side of the holder block at right-angles to the lathe spindle. Clamped tightly in the tool holder is a lathe tool 38 operating externally upon a rod, indicated by chain-dotted lines, to turn it down.

Fig. 10 illustrates a tool holder clamped onto the clamping side of the holder block parallel with the lathe spindle. Here, the tool holder has tightly clamped therein a lathe tool 39 to make a bore in the work piece.

Having now particularly described the nature of my invention and the manner of its operation what I claim is:

1. Holder block for tool holders comprising a block provided with means for attaching the same to a support of a machine and with clamping means adapted for the clamping of tool holders, said clamping means comprising a clamping member displaceably mounted in the holder block and arranged to engage a recess provided in the tool holder and by its displacement to clamp the tool holder onto the holder block and to loosen the same therefrom respectively, a locking bolt being rotatably mounted in the holder block and extending through a recess in the clamping member, said locking bolt being provided with an eccentric portion, two parts being attached in the clamping member on opposite sides of the eccentric portion of said locking bolt and adapted to be adjustable in the direction of displacement of the clamping member, said eccentric portion being adapted at the turning of the locking bolt to exert a pressure on the clamping member by way of one or the other of said adjustable parts to move the clamping member for the purpose of clamping the tool holder or loosening the latter respectively.

2. Holder block for tool holders comprising a block provided with means for attaching the same to a support of a machine and with clamping means adapted for the clamping of tool holders, said clamping means comprising a clamping member displaceably mounted in the holder block and arranged to engage a recess provided in the tool holder and by its displacement to clamp the tool holder onto the holder block and to loosen the same therefrom respectively, a locking bolt being rotatably mounted in the holder block and extending through a recess in the clamping member, said locking bolt being provided with an eccentric portion, adjustable set screws being threaded into the clamping member on opposite sides of the eccentric portion of said locking bolt in the direction of displacement of the clamping member, said eccentric portion being adapted at the turning of the locking bolt to exert a pressure on the clamping member by way of one or the other of said set screws to move the clamping member, for the purpose of clamping the tool holder or loosening the latter respectively.

3. Holder block according to claim 2, and provided with two such displaceable clamping members for tool holders on adjacent sides of the holder block and arranged with their directions of displacement at right angles to each other, to render possible an alternative clamping of a tool holder on these different sides of the holder block.

4. Holder block according to claim 2, and provided with two such displaceable clamping members for tool holders on adjacent sides of the holder block and arranged with their directions of displacement at right angles to each other, to render possible an alternative clamping of a tool holder on these different sides of the holder block, a recess being provided in the upper corners of the holder block on both sides of each clamping member, against the bottom of which recesses set screws threaded into the tool holder are adapted to be set for vertical adjustment of the tool holder.

5. Holder block according to claim 2, and provided with two such displaceable clamping members for tool holders on adjacent sides of the holder block and arranged with their directions of displacement at right angles to each other, to render possible an alternative clamping of a tool holder on these different sides of the holder block, a recess being provided in the upper corners of the holder block on both sides of each clamping member, against the bottom of which recesses set screws threaded into the tool holder are adapted to be set for vertical adjustment of the tool holder, three upper corners of the holder block being provided with such recesses, one of which recesses is arranged to be common at the alternative securing of tool holders on the two adjacent clamping sides of the holder block.

6. Holder block according to claim 2, and provided with two such displaceable clamping members for tool holders on adjacent sides of the holder block and arranged with their directions of displacement at right angles to each other, to render possible an alternative clamping of a tool holder on these different sides of the holder block, a recess being provided in the upper corners of the holder block on both sides of each clamping member, against the bottom of which recesses set screws threaded into the tool holder are adapted to be set for vertical adjustment of the tool holder, the holder block as well as the clamping member being provided with oblique vertical clamping surfaces cooperating with each other and arranged between said recessed corners of the holder block and the clamping member.

ROAR HENRY BERGSTRÖM.